Nov. 9, 1954   B. F. CURRIE   2,693,724
SAW CONDITIONING MEANS
Filed June 3, 1953

INVENTOR.
Bert F. Currie
BY
Alex. E. MacRae
Attorney.

United States Patent Office 2,693,724
Patented Nov. 9, 1954

2,693,724
SAW CONDITIONING MEANS

Bert F. Currie, Thessalon, Ontario, Canada, assignor to Currie Bros., Thessalon, Ontario, Canada, a partnership Application June 3, 1953, Serial No. 359,387

5 Claims. (Cl. 76—31)

This invention relates to saw conditioning means and more particularly to a supporting device for use in conditioning chain saws.

The conditioning or sharpening of chain saws is an awkward and time-consuming operation, and many attempts have heretofore been made to simplify the operation. Such prior proposals usually entail the removal of the saw from the sawing machine and mounting of the saw in a holder while the filing or other conditioning steps are carried out.

It is an object of the present invention to provide a supporting device which may be clamped directly to the chain saw blade, thus eliminating the necessity of detaching the saw from the machine in which it is mounted, such device being thereafter conveniently employed as a gauging and supporting means for carrying out jointing and filing operations on the saw.

Another object is to provide such a device which may be conveniently employed to carry out chain link riveting operations.

Figure 1:
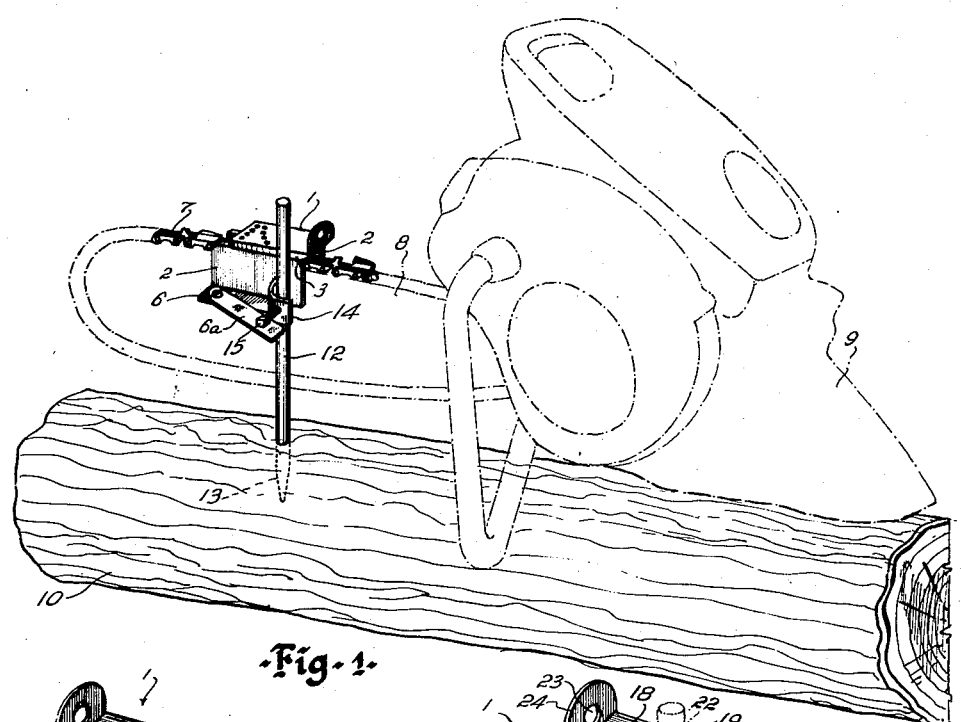
Figures 2, 3:
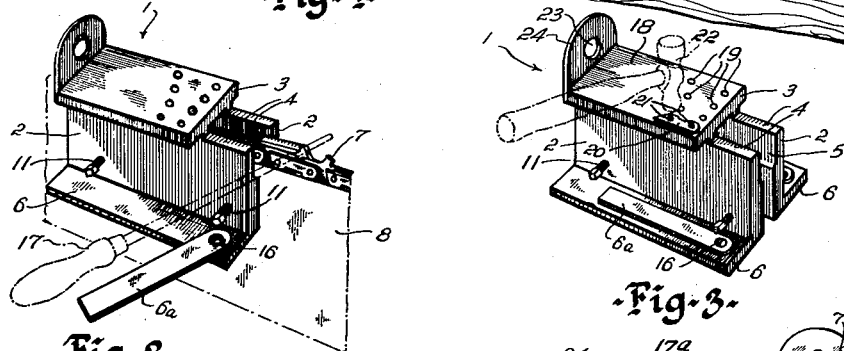
Figure 2A:
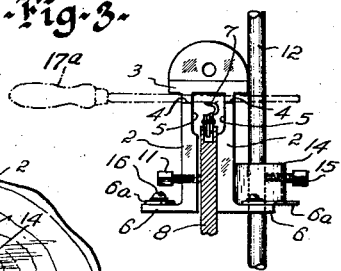
Figure 4:
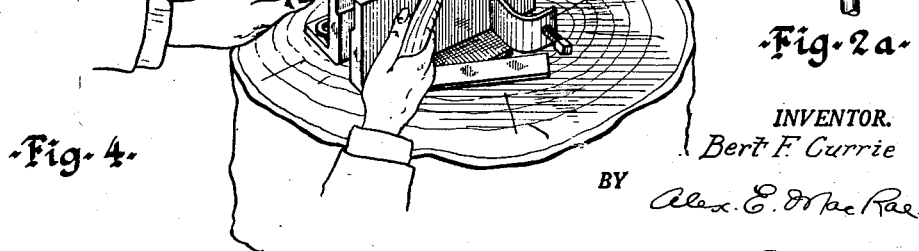

The invention will be described with reference to the accompanying drawing, in which:

Figure 1 is a perspective view of the device according to the invention mounted in conditioning relation to a chain saw, Figure 2 is an enlarged perspective view of the device from another side, Figure 2a is an end view of the device in position on a saw blade, and Figures 3 and 4 are perspective views of the device in use as a riveting means.

The supporting device in accordance with the invention comprises a unitary elongated U-shaped member 1 having spaced parallel side walls 2 and a top wall 3 connecting the longitudinal edges of the side walls. The wall 3 terminates in spaced relation to one end of the walls 2 to expose recessed uniplanar longitudinal edge portions 4 of walls 2. Portions 4 lie in a plane spaced from the plane of the interior surface of wall 3. Preferably also, the interior surfaces of walls 2 adjoining the interior surface of wall 3 are longitudinally recessed as indicated at 5.

The edge portions 4 are hardened to withstand the abrasive action of a file thereon.

An externally extending flange 6 may be provided along the other longitudinal edge of each wall 2. A gauge strip 6a is pivotally mounted by means of a screw 16 on each flange 6 adjacent one end thereof.

In use, the device is arranged to be applied directly to a chain saw 7 while in place on a saw blade 8 of a sawing machine 9, which may be conveniently seated upon a log 10.

The device is mounted astride the chain saw 7 and saw blade 8, the unrecessed inner surfaces of walls 2 being spaced apart a distance approximately equal to the thickness of a standard chain saw blade whereby such surfaces engage the opposed sides of the blade, as clearly shown in Figure 2a. The device is positioned in such relation to the saw that the plane of surfaces 4 lies coincident with the correct plane of the tooth edges of the saw. The device is then securely fixed to the blade 8 by means of the set screws 11 in one wall 2 of the device adjacent flange 6. In order to hold the saw and blade in rigid position, a metal post 12 having a sharpened end 13 is driven into the log 10, such post being in close proximity to one of walls 2, on which is provided an L-shaped arm or lug 14 extending partly around the post. A set screw 15 is provided in the lug 14 to clamp the post securely against the device.

Jointing of the saw is proceeded with by reciprocating a jointing tool, as indicated at 17a in Figure 2a, across the gauge surfaces 4 as each tooth is successively moved into position between such surfaces.

Filing of the saw teeth is proceeded with after swinging the gauge strips 6a outwardly to the correct angle to be applied to the saw tooth surface and then tightening such strips into place by means of the pivot screws 16. In applying the file, indicated at 17, to the teeth, the proper angle of application may readily be maintained by lining it up and keeping it parallel with the respective gauge strip 6a.

It will be apparent that the saw and saw blade will be held in rigid position during the filing and jointing operations by means of the post 12 which is anchored in the log.

The device may also be employed as a small portable anvil for use in replacing saw links in the chain. Referring to Figures 3 and 4, it is proposed to use the exterior flat surface 18 of wall 3, which is hardened in the usual manner, as an anvil surface. A number of pairs of holes 19, of varying diameter and spacing, corresponding to the diameters and spacing or rivet heads in chain links, are provided in such surface. A chain link 20, to be inserted in a saw, is placed upon the anvil surface 18 with rivets 21 inserted therein and projecting ends of the rivets extending into a respective pair of holes 19. The other ends of the rivets are then upset by means of the hammer 22 to secure the rivets to the link. The link 20 is then inserted in the chain saw 7 and laid in reverse position upon the anvil surface 18, as shown in Figure 4, whereupon the riveting is completed by upsetting the other ends of the rivets 21. While conducting the latter riveting step, the saw may be held rigidly in position on the surface 18 by inserting the sharpened end of post 12 through a hole 23 in a flange 24 extending upwardly from wall 3, and bearing down upon the saw with the post by grasping the other end thereof, as clearly shown in Figure 4.

There has thus been provided a device which may be conveniently employed to carry out, in an effective manner, all required conditioning operations on chain saws.

I claim:

1. A supporting device for use in conditioning chain saws which comprises a unitary member having a pair of spaced parallel rectangular side walls arranged to embrace a saw blade therebetween, and a top wall connecting longitudinal edges of said side walls, means carried by at least one of said side walls for securing said member to a saw blade, a post engageable with the other side of said member, means carried by the other side wall for clamping the post to said member, said top wall terminating in spaced relation to one end of said side walls to expose portions of said longitudinal edges, said edge portions being in opposed relation to each other and lying in a common plane spaced below the plane of said top wall.

2. A supporting device as defined in claim 1, including an outwardly directed flange adjacent each of the other longitudinal edges of said side walls, and a gauge strip pivotally carried by each said flange.

3. A supporting device as defined in claim 1, the interior surface of each said side wall being longitudinally recessed adjoining said top wall.

4. A supporting device as defined in claim 1, said top wall having a hardened outer anvil surface, said anvil surface having therein a plurality of pairs of rivet head receiving openings, said pairs of openings varying in diameter and spacing from each other.

5. A supporting device as defined in claim 1, said top wall having a hardened outer anvil surface, and an apertured flange extending upwardly from one end thereof.

References Cited in the file of this patent

UNITED STATES PATENTS

| Number | Name | Date |
|---|---|---|
| 657,850 | Bartlett | Sept. 11, 1900 |
| 740,833 | Evans et al. | Oct. 6, 1903 |
| 2,415,137 | Johnson | Feb. 4, 1947 |
| 2,480,546 | Bryson | Aug. 30, 1949 |